(12) United States Patent
Johnson et al.

(10) Patent No.: US 8,622,079 B2
(45) Date of Patent: Jan. 7, 2014

(54) METHOD FOR EXTENDING THE USAGE LIFE OF OIL IN A DEEP FAT FRYER

(75) Inventors: Michael Frank Gray Johnson, Elmhurst, IL (US); James Timothy Cole, Algonquin, IL (US)

(73) Assignee: Utilization Technology Development, NFP, Des Plaines, IL (US)

( * ) Notice: Subject to any disclaimer, the term of this patent is extended or adjusted under 35 U.S.C. 154(b) by 510 days.

(21) Appl. No.: 12/943,993

(22) Filed: Nov. 11, 2010

(65) Prior Publication Data

US 2012/0118393 A1    May 17, 2012

(51) Int. Cl.
| | |
|---|---|
| *F16K 21/18* | (2006.01) |
| *F16K 31/18* | (2006.01) |
| *A47J 27/00* | (2006.01) |
| *A47J 37/12* | (2006.01) |
| *A23L 1/28* | (2006.01) |

(52) U.S. Cl.
USPC ............... 137/386; 137/412; 99/330; 99/408; 426/438

(58) Field of Classification Search
USPC .......... 137/386, 390, 398, 412; 426/231, 438; 99/330, 408, 407, 403
See application file for complete search history.

(56) References Cited

U.S. PATENT DOCUMENTS

| | | | |
|---|---|---|---|
| 4,050,447 A * | 9/1977 | Terracciano | 126/374.1 |
| 5,722,289 A | 3/1998 | Carr | |
| 5,776,530 A | 7/1998 | Davis et al. | |
| 6,780,277 B2 * | 8/2004 | Yokomizo et al. | 156/345.11 |
| 2004/0112225 A1 * | 6/2004 | Mercer et al. | 99/330 |
| 2008/0213446 A1 * | 9/2008 | Feinberg et al. | 426/417 |

OTHER PUBLICATIONS

Website: http://www.webstaurantstore.com/guide/87/fryer-oil-filtering-frypowder.html (dated Feb. 15, 2010).*

* cited by examiner

*Primary Examiner* — John K Fristoe, Jr.
*Assistant Examiner* — Michael R Reid
(74) *Attorney, Agent, or Firm* — Pauley Petersen & Erickson

(57) ABSTRACT

A method and apparatus for extending the usage life of cooking oil used in a deep fat fryer in which the desired cooking oil usage life is determined. Upon the occurrence of a triggering event, the level of cooking oil in the vat of the deep fat fryer is varied between an upper first level and a lower second level by extraction of used cooking oil from the vat until the cooking oil level reaches the lower second level and subsequent input of fresh cooking oil until the level of cooking oil, used and fresh, in the vat reaches the upper first level.

18 Claims, 3 Drawing Sheets

METHOD FOR EXTENDING THE USAGE LIFE OF OIL IN A DEEP FAT FRYER

BACKGROUND OF THE INVENTION

1. Field of the Invention

This invention relates to deep fat fryers. In one aspect, this invention relates to extending the usage life of cooking oil in deep fat fryers. In one aspect, this invention relates to a method for extending the usage life of cooking oil in deep fat fryers. In one aspect, this invention relates to an apparatus for automatically extending the usage life of cooking oil in deep fat fryers.

2. Description of Related Art

Typically, cooking oil in a deep fat fryer is used until the total amount of foreign particles or compounds in the cooking oil accumulate so as to negatively affect the color of the cooking oil or the taste of the food prepared with the cooking oil. Upon the occurrence of such triggering events, in accordance with conventional practice, the entire vat of cooking oil in the fryer is drained and replaced with fresh cooking oil.

During the normal operation of a deep fat fryer, a certain amount of oil is removed by the products being fried, a process referred to as dragout, and must be replaced with fresh oil in order to maintain the correct volume for cooking. Typically, restaurants add new cooking oil at the end of the day. The addition of fresh cooking oil necessitated by the dragout to the volume of used cooking oil in the fryer effectively, but only marginally, increases the usage life of the cooking oil or extends the amount of time before the cooking oil has to be discarded and replaced with fresh cooking oil. This is because the additional fresh cooking oil is replacing used cooking oil corresponding to the dragout and this additional fresh oil "refreshes" or decreases the average age of the cooking oil.

Deep fat fryers typically use about 30 to 50 pounds of cooking oil during operation. Despite advanced filtering methods and frying practices, the operation of the fryer degrades the oil at a rate where the entire vat has to be thrown away. This results in thousands of pounds of cooking oil being discarded per year at a typical restaurant. By increasing the cooking oil life, a large percentage of the discarded cooking oil could be eliminated, saving both oil costs and disposal costs.

Current deep fat fryers either rely on the operator to manually refill the vat to the marked oil level depth or use a single oil level sensor to continuously top off and maintain the oil level at the height of the single oil level height sensor. While such practices provide a small amount of cooking oil refreshment, such practices do not substantially increase the usage life of the cooking oil.

SUMMARY OF THE INVENTION

It is one object of this invention to provide a method for substantially extending the usage life of cooking oil used in deep fat fryers.

It is another object of this invention to provide an apparatus for automatically extending the usage life of cooking oil used in deep fat fryers.

These and other objects of this invention by a method for extending the usage life of cooking oil in which a determination is made of the desired usage life of the cooking oil. A first level sensor adapted to measure a first level of cooking oil corresponding to a total volume of the cooking oil in a vat containing the cooking oil is provided, and a second level sensor adapted to measure a second level of the cooking oil corresponding to a minimum volume of cooking oil in the vat is provided, where the difference between the first level and the second level corresponds to an amount of fresh cooking oil to be added to the vat to refresh the cooking oil and extend the cooking oil usage life for the desired period of time. A triggering event, the occurrence of which initiates refreshing of the cooking oil, is determined. Upon occurrence of the triggering event, the amount of cooking oil in the vat is reduced to the second level indicated by the second level sensor. Thereafter, the vat is filled with fresh cooking oil up to the level indicated by the first level sensor. The steps of reducing the amount of cooking oil in the vat and filling the vat with fresh cooking oil are repeated upon each occurrence of the triggering event.

The method of this invention may be carried out in a deep fat fryer in accordance with one embodiment of this invention comprising a vat containing cooking oil, heating means for heating the cooking oil, a first oil level sensor adapted to measure a first cooking oil level, a second oil level sensor adapted to measure a second oil level lower than the first cooking oil level, automatic extraction means for extracting a portion of the cooking oil from the vat, automatic input means for introducing fresh cooking oil into the vat, usage life means for automatically determining a cooking oil level difference between the first cooking oil level and the second cooking oil level, where the cooking oil level difference corresponds to a predetermined cooking oil usage life, and control means for automatically reducing the cooking oil level to the second cooking oil level and for automatically introducing the fresh cooking oil into the vat to increase the cooking oil level to the first cooking oil level.

BRIEF DESCRIPTION OF THE DRAWINGS

These and other objects and features of this invention will be better understood from the following detailed description of the drawings taken in conjunction with the drawings, wherein.

DETAILED DESCRIPTION OF THE PRESENTLY PREFERRED EMBODIMENTS

Figure 1:
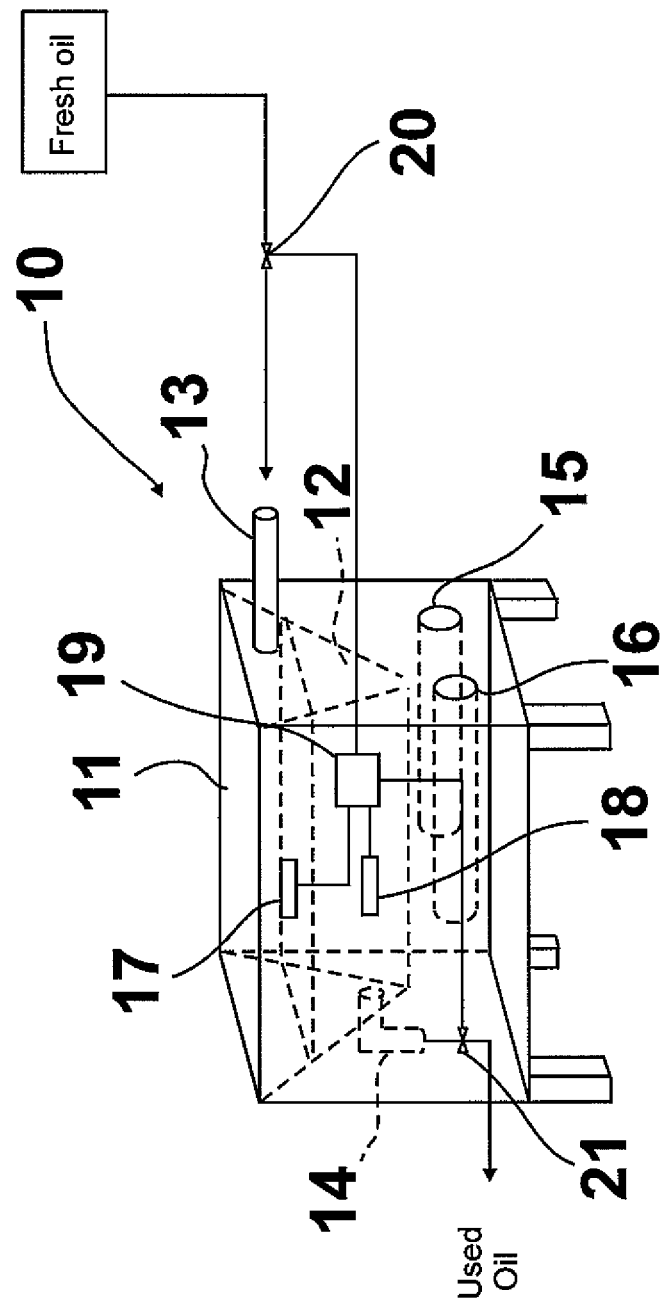
FIG. 1 is a diagram of a deep fat fryer in accordance with one embodiment of this invention.

FIG. 1 shows a deep fat fryer 10 in accordance with one embodiment of this invention. The deep fat fryer comprises a vat 11 containing a cooking oil 12 and having a fresh cooking oil inlet 13 in fluid communication with a fresh cooking oil supply and a used cooking oil outlet 14. Levels of the cooking oil in the vat are monitored by first cooking oil level sensor 17 and second cooking oil level sensor 18. The first cooking oil level sensor is disposed at an upper level in the vat corresponding to the maximum volume of cooking oil to be contained within the vat. The second cooking oil level sensor is disposed at a lower level in the vat lower than the first cooking oil level sensor, wherein the cooking oil volume represented by the difference between the upper and lower levels corresponds to a desired usage life for the cooking oil.

As previously indicated, during normal operation of the fryer, a certain portion of the cooking oil in the vat is removed from the vat by the food being fried, thereby reducing the level of cooking oil in the vat to a point below the first cooking oil level sensor. The measurement location, i.e. the lower cooking oil level, for the second cooking oil level sensor is based on a determination of the desired extension of cooking oil usage life. In general, as the amount of fresh cooking oil introduced into the vat as a percentage of the maximum volume increases, the longer will be the cooking oil usage life; and, as the desired cooking oil usage life is increased, the measurement location for the second cooking oil level sensor will be lowered. Heating means 15, 16 are provided for heating the cooking oil in the vat. In accordance with one embodiment, the heating means comprises one or more gas-fired burners. In accordance with another embodiment, the heating means comprises one or more electrical elements.

Figure 2:
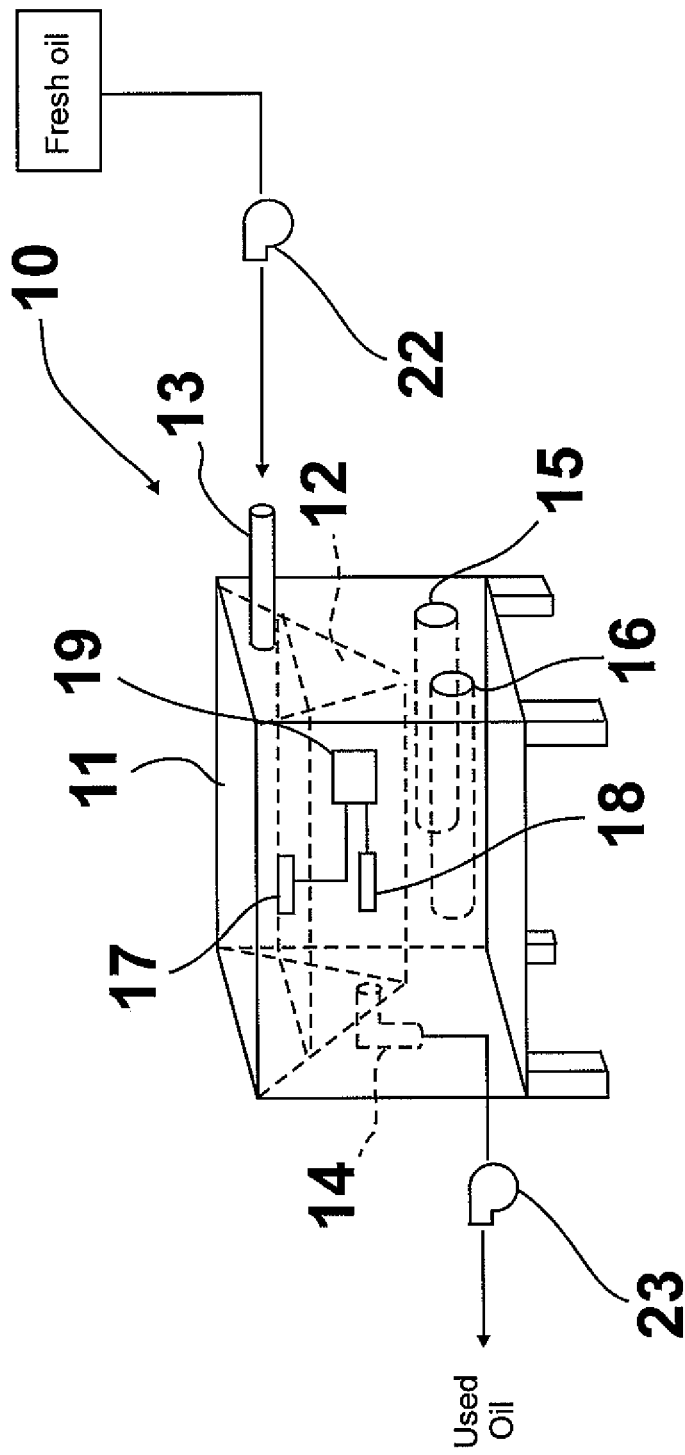
FIG. 2 is a diagram of a deep fat fryer in accordance with another embodiment of this invention.

Input means are provided for introducing the fresh oil into the vat as needed. In accordance with one embodiment of this invention, the input means are in the form of a valve 20 (FIG. 1); in accordance with another embodiment of this invention, the input means are in the form of a pump 22 (FIG. 2). Extraction means are provided for removing used cooking oil from the vat as needed. In accordance with one embodiment, the extraction means are in the form of a valve 21 (FIG. 1); in accordance with another embodiment of this invention, the extraction means are in the form of a pump 23 (FIG. 2).

The time at which fresh cooking oil is introduced into the vat in accordance with the method of this invention is determined by the occurrence of a triggering event. Some triggering events may be automated, such as a set period of usage, while other triggering events may be based on criteria which are not readily subject to automation, such as observations of the fryer operator, examples of which include color of the cooking oil and taste of the food produced by the fryer. The method of this invention may be employed with either type of triggering event.

In accordance with one embodiment of this invention, the deep fat fryer of this invention further comprises a controller 19 adapted to automatically control the introduction of fresh cooking oil and the extraction of used cooking oil. As shown in FIG. 1, the controller is operably connected with the first and second cooking oil level sensors 17, 18, input valve 20 for introducing fresh cooking oil into the fryer, and extraction valve 21 for extracting cooking oil from the fryer. In accordance with one embodiment of this invention, the controller includes an algorithm which determines the first and second cooking oil levels in the vat based upon an input of the desired cooking oil usage life. In particular, the algorithm determines a replacement fresh cooking oil volume corresponding to a predetermined cooking oil usage life and a cooking oil extraction rate required to enable introduction of an amount of the fresh cooking oil corresponding to the replacement fresh cooking oil volume. Upon the occurrence of a triggering event, the controller reduces the cooking oil level in the vat using the extraction means, if necessary, until the lower cooking oil level is detected by the second cooking oil level sensor, at which point operation of the extraction means is terminated and operation of the input means initiated for introduction of fresh cooking oil into the vat. When the first cooking oil level sensor detects the cooking oil at the upper level, operation of the input means is terminated. The sequence is repeated upon each occurrence of a triggering event until the desired usage life is reached.

Figure 3:
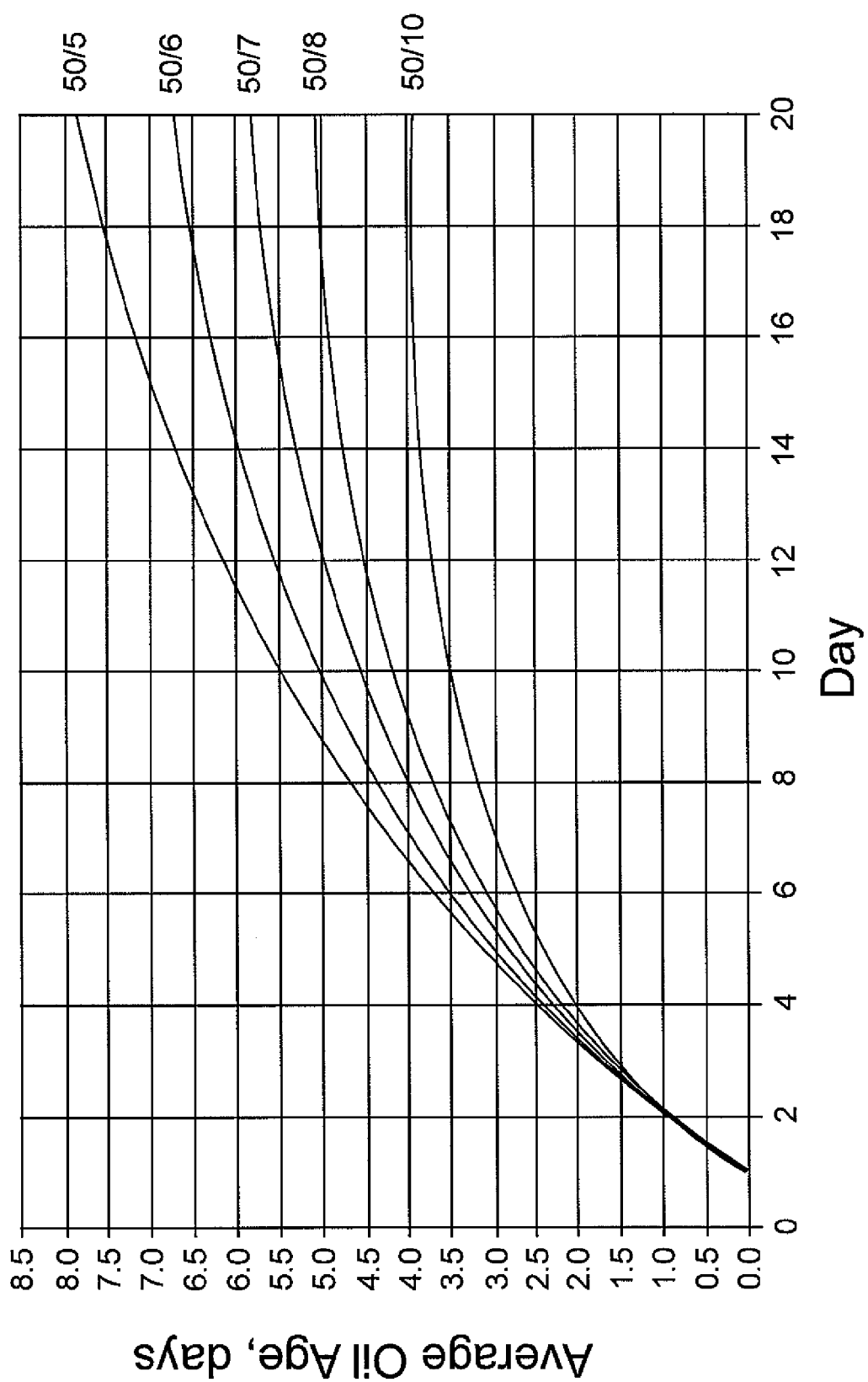
FIG. 3 is a diagram showing exemplary curves for the average oil age of cooking oil in a fryer employing the method of this invention.

The usage life of cooking oil used in a fryer is a function of the total volume of cooking oil in the fryer and the volume of replacement fresh oil. FIG. 3 shows the effect of total volume versus volume of replacement fresh oil for a deep fat fryer in which the total volume of cooking oil is 50 pounds and the extraction rate is varied between 5 and 10 lbs per day. As can be seen, as the amount of fresh cooking oil introduced into the fryer increases, the average cooking oil age at a given point in time decreases. It will be appreciated by those skilled in the art that, if the correct amounts of used cooking oil extraction and fresh cooking oil input are used, it may be possible to avoid indefinitely the replacement of all of the used cooking oil with fresh cooking oil at one time.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. An apparatus for cooking food comprising:
   a vat containing cooking oil;
   heating means for heating said cooking oil;
   automatic level means for measuring a level of said cooking oil in said vat;
   extraction means for extracting a portion of said cooking oil from said vat;
   input means for introducing fresh cooking oil into said vat connected with a fresh cooking oil supply;
   usage life means for automatically determining a cooking oil level difference between a maximum cooking oil level in said vat and a predetermined minimum cooking oil level in said vat, said cooking oil level difference corresponding to a predetermined cooking oil usage life; and
   control means for automatically replacing a predetermined amount of said cooking oil in said vat with said fresh cooking oil to extend said cooking oil usage life by automatically extracting an amount of said cooking oil from said vat upon a triggering event to reduce said cooking oil level to said minimum cooking oil level and introducing said fresh cooking oil into said vat to increase said cooking oil level from said minimum cooking oil level to said maximum cooking oil level.

2. The apparatus of claim 1, wherein said usage life means comprises an algorithm for determining said cooking oil level difference, said algorithm determining a replacement fresh cooking oil volume corresponding to said predetermined cooking oil usage life and a cooking oil extraction rate required to enable introduction of an amount of said fresh cooking oil corresponding to said replacement fresh cooking oil volume.

3. The apparatus of claim 1, wherein said extraction means comprises an outlet valve adapted to automatically open for removal of said portion of said cooking oil from said vat operably connected with said control means.

4. The apparatus of claim 1, wherein said extraction means comprises a pump adapted to automatically pump said portion of said cooking oil out of said vat operably connected with said control means.

5. The apparatus of claim 1, wherein said input means comprises an inlet valve in fluid communication with said fresh cooking oil supply adapted to automatically open for introduction of said fresh cooking oil into said vat operably connected with said control means.

6. The apparatus of claim 1, wherein said input means comprises a pump adapted to automatically pump said fresh cooking oil into said vat operably connected with said control means.

7. The apparatus of claim 1, wherein said automatic level means comprises a maximum cooking oil level sensor adapted to sense said cooking oil level at said maximum cooking oil level and a minimum cooking oil level sensor adapted to sense said cooking oil level at said minimum cooking oil level, said sensors operably connected with said control means.

8. The apparatus of claim 1, wherein said automatic level means comprises a floating sensor floating on top of said cooking oil operably connected with said control means.

9. A method for extending usage life of cooking oil comprising the steps of:
- determining a desired cooking oil usage life;
- determining a maximum volume of said cooking oil in a cooking oil containment vessel;
- determining a replacement volume of fresh cooking oil required to achieve the desired cooking oil usage life;
- determining an upper cooking oil level in said cooking oil containment vessel corresponding to said maximum volume of said cooking oil;
- determining a lower cooking oil level in said cooking oil containment vessel, wherein a difference between said upper cooking oil level and said lower cooking oil level corresponds to said replacement volume of said fresh cooking oil required to achieve said desired cooking oil usage life;
- automatically determining a cooking oil extraction rate required to enable introduction of said replacement volume of said fresh cooking oil;
- automatically extracting an amount of said cooking oil equal to said determined replacement volume of said fresh cooking oil from said cooking oil containment vessel at said cooking oil extraction rate; and
- automatically introducing said replacement volume of said fresh cooking oil into said cooking oil containment vessel until said cooking oil level reaches said upper cooking oil level,
wherein said upper cooking oil level is measured with an upper-level sensor connected with said cooking oil containment vessel and said lower cooking oil level is measured with a lower level sensor connected with said cooking oil containment vessel.

10. The method of claim 9, wherein said extracting of said cooking oil from said cooking oil containment vessel is initiated by a triggering event.

11. The method of claim 10, wherein said triggering event is automated.

12. An apparatus for cooking food comprising:
- a vat containing a cooking oil;
- heating means for heating said cooking oil;
- a first oil level sensor adapted to measure a first cooking oil level corresponding to a total amount of said cooking oil in said vat;
- a second oil level sensor adapted to measure a second cooking oil level less than said first cooking oil level in said vat;
- extraction means for permanently extracting a portion of said cooking oil from said vat;
- input means for introducing fresh cooking oil into said vat;
- usage life means for automatically determining a cooking oil level difference between said first cooking oil level and said second cooking oil level, said cooking oil level difference corresponding to a predetermined cooking oil usage life; and
- control means for automatically permanently extracting an amount of said cooking oil in said vat to reduce said cooking oil level to said second cooking oil level and for automatically replacing the extracted amount of said cooking oil with said fresh cooking oil into said vat to increase said cooking oil level to said first cooking oil level.

13. The apparatus of claim 12, wherein said extraction means comprises an outlet valve adapted to automatically open when triggered for release of said portion of said cooking oil from said vat.

14. The apparatus of claim 12, wherein said extraction means comprises a pump adapted to automatically pump said cooking oil out of said vat when triggered for release of said portion of said cooking oil from said vat.

15. The apparatus of claim 12, wherein said input means comprises an inlet valve adapted to automatically open when triggered for admission of said fresh cooking oil into said vat.

16. The apparatus of claim 12, wherein said input means comprises a pump adapted to automatically pump said fresh cooking oil when triggered into said vat.

17. A method for extending usage life of used cooking oil comprising the steps of:
- determining a desired amount of time for extension of said usage life of said cooking oil;
- providing a first level sensor adapted to measure a first level of cooking oil corresponding to a total volume of said cooking oil in a vat containing said cooking oil;
- providing a second level sensor adapted to measure a second level of said cooking oil corresponding to a minimum volume of said cooking oil in said vat wherein a difference between said total volume and said minimum volume corresponds to an amount of fresh oil to be added to said vat to refresh said cooking oil and extend cooking oil life for the desired amount of time;
- determining a triggering event for initiating refreshing of said cooking oil;
- automatically replacing an amount of said cooking oil in said vat with said amount of fresh oil upon occurrence of said triggering event by reducing said cooking oil to said second level of said cooking oil;
- filling said vat with fresh cooking oil up to said first level of said cooking oil; and
- repeating said reducing and filling steps upon each occurrence of said triggering event.

18. The method of claim 17, wherein said reducing and filling steps are performed automatically upon each said occurrence of said triggering event.

* * * * *